(12) United States Patent
Phillips et al.

(10) Patent No.: US 7,824,304 B2
(45) Date of Patent: Nov. 2, 2010

(54) MULTI-SPEED TRANSMISSION

(75) Inventors: Andrew W. Phillips, Saline, MI (US); Craig S. Ross, Ypsilanti, MI (US); Scott H. Wittkopp, Ypsilanti, MI (US); James M. Hart, Belleville, MI (US); Clinton E. Carey, Monroe, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 427 days.

(21) Appl. No.: 11/873,760

(22) Filed: Oct. 17, 2007

(65) Prior Publication Data
US 2008/0119318 A1    May 22, 2008

Related U.S. Application Data

(60) Provisional application No. 60/866,702, filed on Nov. 21, 2006.

(51) Int. Cl.
*F16H 3/44*    (2006.01)

(52) U.S. Cl. .................. 475/323; 475/271; 475/330

(58) Field of Classification Search .............. 475/269, 475/271, 272, 275, 323, 330
See application file for complete search history.

(56) References Cited

U.S. PATENT DOCUMENTS

| | | | |
|---|---|---|---|
| 5,951,432 A | 9/1999 | Wehking | |
| 6,669,595 B1* | 12/2003 | Raghavan et al. | 475/275 |
| 6,689,011 B1* | 2/2004 | Raghavan et al. | 475/296 |
| 6,746,360 B2* | 6/2004 | Bucknor et al. | 475/296 |
| 7,651,434 B2* | 1/2010 | Carey et al. | 475/323 |
| 2004/0053732 A1* | 3/2004 | Usoro et al. | 475/275 |

* cited by examiner

*Primary Examiner*—David D Le

(57) ABSTRACT

A transmission is disclosed having an input member, an output member, first, second and third planetary gear sets, a first interconnecting member, a second interconnecting member and six torque-transmitting mechanisms. The torque-transmitting mechanisms are selectively engageable in combinations of at least three to establish at least eight forward speed ratios and at least one reverse speed ratio between the input member and the output member. The planetary gear sets each have first, second and third members. The six torque-transmitting mechanisms are selectively engageable to interconnect one of the first, second, and third members with another of the first, second, and third members.

14 Claims, 3 Drawing Sheets

| GEAR RATIO | GEAR STATE | CLUTCHES | | | | | |
|---|---|---|---|---|---|---|---|
| | | 80 | 78 | 76 | 74 | 70 | 72 |
| -2.000 | Rev 2 | X | | | X | X | |
| -3.176 | Rev 1 | X | | X | | X | |
| | N | | | | | | |
| 4.700 | 1ST | X | X | X | | | |
| 2.959 | 2ND | X | X | | X | | |
| 2.233 | 3RD | | X | X | X | | |
| 1.639 | 4TH | | X | | X | X | |
| 1.257 | 5TH | | X | X | | X | |
| 1.000 | 6TH | | X | X | | | X |
| 0.844 | 7TH | | | X | | X | X |
| 0.667 | 8TH | | | X | X | | X |

X = Engaged

FIG. 5

MULTI-SPEED TRANSMISSION

CROSS-REFERENCE TO RELATED APPLICATIONS

This application claims the benefit of U.S. Provisional Application No. 60/866,702, filed on Nov. 21, 2006. The disclosure of the above application is incorporated herein by reference.

TECHNICAL FIELD

The invention relates to a multi-speed transmission having both a plurality of planetary gear sets and torque transmitting devices that are selectively engageable to achieve multiple gear ratios.

BACKGROUND

A typical multi-speed transmission uses a combination of friction clutches and planetary gear arrangements to achieve a plurality of gear ratios. The number and placement of the planetary gear sets, generally, are dictated by packaging, cost and desired speed ratios.

While conventional transmissions achieve their intended purpose, the need for new and improved transmission configurations continues with the design of lighter and more compact vehicles. Accordingly, there is a need for a cost-effective, compact and multi-speed transmission.

SUMMARY

A transmission is provided having an input member, an output member, first, second and third planetary gear sets, a first interconnecting member, a second interconnecting member and six torque-transmitting mechanisms. The torque-transmitting mechanisms are selectively engageable in combinations of at least three to establish at least eight forward speed ratios and at least one reverse speed ratio between the input member and the output member. The planetary gear sets each have first, second and third members. The first interconnecting member continuously interconnects the first member of the first planetary gear set with a stationary element. The second interconnecting member continuously interconnects the third member of the second planetary gear set with the third member of the third planetary gear set. The six torque-transmitting mechanisms are selectively engageable to interconnect one of the first, second, and third members with another of the first, second, and third members.

In another aspect of the present invention, a first of the six torque transmitting mechanisms is selectively engageable to interconnect the third member of the first planetary gear set with the input member.

In another aspect of the present invention, a second of the six torque transmitting mechanisms is selectively engageable to interconnect the second member of the second planetary gear set with the input member.

In another aspect of the present invention, a third of the six torque transmitting mechanisms is selectively engageable to interconnect the third member of the first planetary gear set with the first member of the third planetary gear set.

In another aspect of the present invention, a fourth of the six torque transmitting mechanisms is selectively engageable to interconnect the second member of the first planetary gear set with the first member of the third planetary gear set.

In another aspect of the present invention, a fifth of the six torque transmitting mechanisms is selectively engageable to interconnect the second member of the first planetary gear set with the second member of the second planetary gear set.

In another aspect of the present invention, a sixth of the six torque transmitting mechanisms is selectively engageable to interconnect the third member of the third planetary gear set with the stationary member.

In another aspect of the present invention, the torque transmitting mechanisms are clutches.

In another aspect of the present invention, the first members are sun gears, the second members are ring gears, and the third members are carrier members.

In another aspect of the present invention, the input member is continuously interconnected with the first member of the second planetary gear set and the output member is continuously interconnected with the second member of the third planetary gear set.

In another aspect of the present invention, a transmission is provided having an input member, an output member, a first planetary gear set, a second planetary gear set, a third planetary gear set, a first interconnecting member, a second interconnecting member and six torque transmitting mechanisms. The first planetary gear set has a sun gear, a first ring gear, a second ring gear and a carrier member. The second planetary gear set has a sun gear, a ring gear and a carrier member. The third planetary gear set has a sun gear, a ring gear and a carrier member. The input member is continuously interconnected with the sun gear of the second planetary gear set and the output member is continuously interconnected with the ring gear of the third planetary gear set. The first interconnecting member continuously interconnects the sun gear of the first planetary gear set with a stationary element. The second interconnecting member continuously interconnects the carrier member of the second planetary gear set with the carrier member of the third planetary gear set. The first torque transmitting mechanism selectively engageable to interconnect the second ring gear of the first planetary gear set with the input member. The second torque transmitting mechanism selectively engageable to interconnect the ring gear of the second planetary gear set with the sun gear of the second planetary gear set and the input member. The third torque transmitting mechanism selectively engageable to interconnect the carrier member of the first planetary gear set with the sun gear of the third planetary gear set. The fourth torque transmitting mechanism selectively engageable to interconnect the first ring gear of the first planetary gear set with the sun gear of the third planetary gear set. The fifth torque transmitting mechanism selectively engageable to interconnect the carrier member of the first planetary gear set with the ring gear of the second planetary gear set. The sixth torque transmitting mechanism selectively engageable to interconnect the carrier member of the third planetary gear set with the stationary member. The torque-transmitting mechanisms are selectively engageable in combinations of at least three to establish at least eight forward speed ratios and at least one reverse speed ratio between the input member and the output member.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 5 is a truth table listing the engaged torque-transmitting mechanisms for selected torque ratios achieved by the transmissions of FIGS. 2 and 4.

DESCRIPTION OF THE PREFERRED EMBODIMENTS

The following description is merely exemplary in nature and is not intended to limit the present disclosure, application, or uses.

Figures 1, 2:
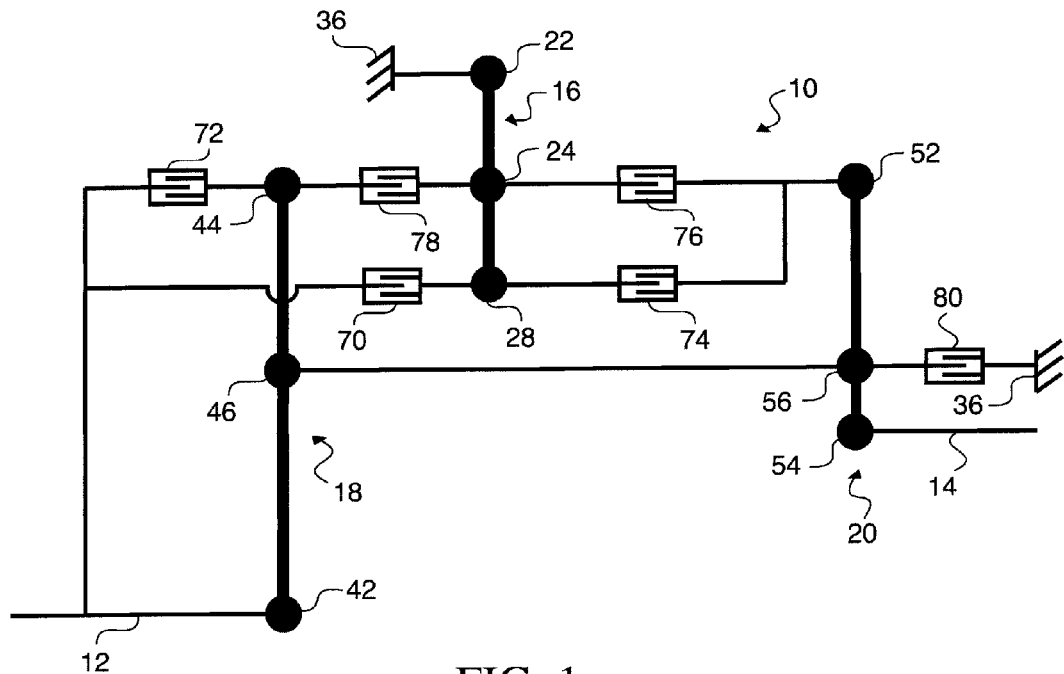
FIG. 1 is a lever diagram of the transmission illustrating the power flow from the input through the gear sets to the output, in accordance with an embodiment of the present invention.
FIG. 2 is a schematic representation of the eight-speed transmission of the embodiment of FIG. 1, in accordance with the present invention.

Referring now to FIG. 1, an embodiment of an eight speed transmission 10 is illustrated in a lever diagram format. A lever diagram is a schematic representation of the components of a mechanical device such as an automatic transmission. Each individual lever represents a planetary gear set wherein the three basic mechanical components of the planetary gear are each represented by a node. Therefore, a single lever contains three nodes: one for the sun gear, one for the planet gear carrier, and one for the ring gear. The relative length between the nodes of each lever can be used to represent the ring-to-sun ratio of each respective gear set. These lever ratios, in turn, are used to vary the gear ratios of the transmission in order to achieve an appropriate ratios and ratio progression. Mechanical couplings or interconnections between the nodes of the various planetary gear sets are illustrated by thin, horizontal lines and torque transmitting devices such as clutches and brakes are presented as interleaved fingers. Further explanation of the format, purpose and use of lever diagrams can be found in SAE Paper 810102, "The Lever Analogy: A New Tool in Transmission Analysis" by Benford and Leising which is hereby fully incorporated by reference.

The transmission 10 includes an input shaft or member or member 12, a first planetary gear set 16 having three nodes: a first node 22, a second node 24 and a third node 28, a second planetary gear set 18 having three nodes: a first node 42, a second node 44 and a third node 46, a third planetary gear set 20 having three nodes: a first node 52, a second node 54 and a third node 56 and an output shaft or member 14.

The input member 12 is coupled to the first node 42 of the second planetary gear set 18. The output member 14 is coupled to the second node 54 of the third planetary gear set 20. The first node 22 of the first planetary gear set 16 is coupled to a stationary element or a transmission housing 36. The third node 46 of the second planetary gear set 18 is coupled to the third node 56 of the third planetary gear set 20.

A first clutch 70 selectively connects the third node 28 of the first planetary gear set 16 with the input 12. A second clutch 72 selectively connects the second node 44 of the second planetary gear set 18 with the input 12. A third clutch 74 selectively connects the third node 28 of the first planetary gear set 16 with the first node 52 of the third planetary gear set 20. A fourth clutch 76 selectively connects the second node 24 of the first planetary gear set 16 and the first node 52 of the third planetary gear set 20. A fifth clutch 78 selectively connects the second node 24 of the first planetary gear set 16 and the second node 44 of the second planetary gear set 18. A brake 80 selectively connects the third node 56 of the third planetary gear set 20 with the stationary element or a transmission housing 36.

Referring now to FIG. 2, a stick diagram presents a schematic layout of the embodiment of the eight speed transmission 10 according to the present invention. In FIG. 2, the numbering from the lever diagram of FIG. 1 is carried over. The clutches, brake and couplings are correspondingly presented whereas the nodes of the planetary gear sets now appear as components of planetary gear sets such as sun gears, ring gears, planet gears and planet gear carriers.

In a preferred embodiment of the present invention, planetary gear set 16 is a planetary gear set that includes a sun gear member 22, a ring gear member 24 and a carrier member 28 that rotatably supports a set of pinion gears 32, 34. Moreover, sun gear member 22 is fixedly connected to a housing 36 of transmission 10 for preventing rotation of sun gear member 22. Ring gear member 24 is connected for common rotation with a first interconnecting shaft or member 38. Carrier member 28 is connected for common rotation with a second interconnecting shaft or member 40 and a third interconnecting shaft or member 45. Pinion gears 32, 34 are configures to intermesh with each other, sun gear member 22 and ring gear member 24.

Planetary gear set 18 includes a sun gear member 42, a ring gear member 44 and a carrier member 46 that rotatably supports a set of pinion gears 48. Sun gear member 42 is connected for common rotation with input shaft or member 12. Carrier member 46 is connected for common rotation with a fourth interconnecting shaft or member 47. Pinion gears 48 are configured to intermesh with both sun gear member 42 and ring gear member 44. Ring gear member 44 is connected for common rotation with a fifth interconnecting shaft or member 50.

Planetary gear set 20 includes a sun gear member 52, a ring gear member 54 and a carrier member 56 that rotatably supports a set of pinion gears 58. Sun gear member 52 is connected for common rotation with a sixth interconnecting shaft or member 60. Ring gear member 54 is connected for common rotation with output shaft or member 14. Carrier member 56 is connected for common rotation with fourth interconnecting shaft or member 47 and a seventh interconnecting shaft or member 62. Pinion gears 58 are configured to intermesh with both sun gear member 52 and ring gear member 54.

First clutch 70 is selectively engagable to connect input shaft or member 12 with a third interconnecting shaft or member 45. Second clutch 72 is selectively engagable to connect input shaft or member 12 with fifth interconnecting shaft or member 50. Third clutch 74 is selectively engagable to connect second interconnecting shaft or member 40 with sixth interconnecting shaft or member 60. Fourth clutch 76 is selectively engagable to connect ring gear member 24 to sixth interconnecting shaft or member 60. Fifth clutch 78 is selectively engagable to connect first interconnecting shaft or member 38 to fifth interconnecting shaft or member 50. Brake 80 is selectively engagable to connect carrier member 56 to housing 36 to restrict rotation of carrier member 56.

Figure 3:
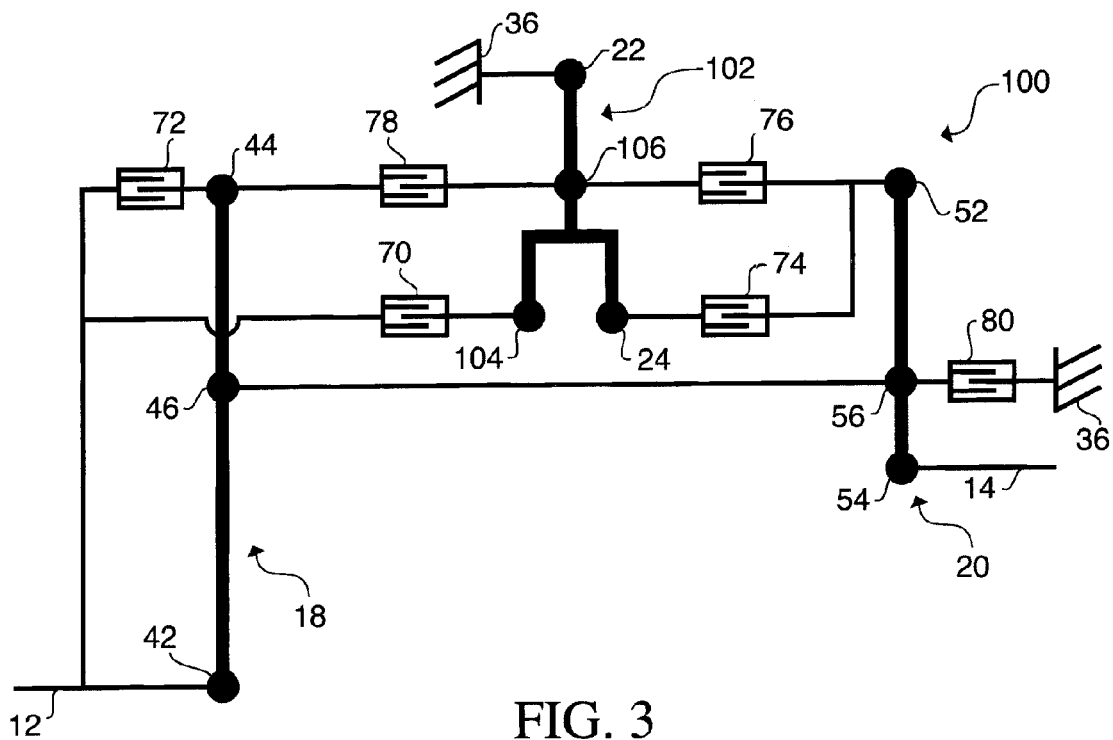
FIG. 3 is a lever diagram of another embodiment of a transmission illustrating the power flow from the input through the gear sets to the output, in accordance with the present invention.

Referring now to FIG. 3, another embodiment of an eight speed transmission 100 is illustrated in a lever diagram format, in accordance with the present invention. The transmission 100 includes an input shaft or member 12, a first planetary gear set 102 having four nodes: a first node 22, a second node 24, a third node 104 and a fourth node 106, a second planetary gear set 18 having three nodes: a first node 42, a second node 44 and a third node 46, a third planetary gear set 20 having three nodes: a first node 52, a second node 54 and a third node 56 and an output shaft or member 14.

The input member 12 is coupled to the first node 42 of the second planetary gear set 18. The output member 14 is coupled to the second node 54 of the third planetary gear set 20. The first node 22 of the first planetary gear set 102 is coupled to a stationary element or a transmission housing 36. The third node 46 of the second planetary gear set 18 is coupled to the third node 56 of the third planetary gear set 20.

A first clutch 70 selectively connects the third node 104 of the first planetary gear set 102 with the input 12. A second clutch 72 selectively connects the second node 44 of the second planetary gear set 18 with the input 12. A third clutch 74 selectively connects the second node 24 of the first planetary gear set 102 with the first node 52 of the third planetary gear set 20. A fourth clutch 76 selectively connects the fourth node 106 of the first planetary gear set 102 with the first node 52 of the third planetary gear set 20. A fifth clutch 78 selectively connects the fourth node 106 of the first planetary gear set 102 with the second node 44 of the second planetary gear set 18. A brake 80 selectively connects the third node 56 of the third planetary gear set 20 with the stationary element or transmission housing 36.

Figure 4:
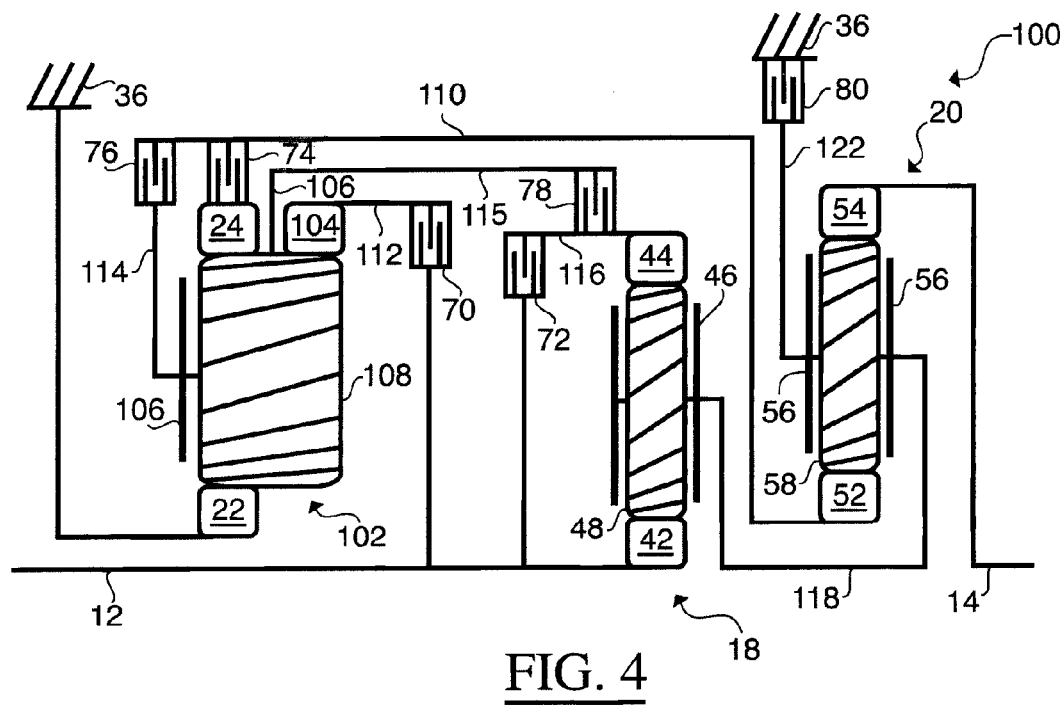
FIG. 4 is a schematic representation of the eight-speed transmission of the embodiment of FIG. 3, in accordance with the present invention.

Referring now to FIG. 4, a stick diagram presents a schematic layout of the embodiment of the eight speed transmission 100 according to the present invention. In the present embodiment, input member 12 and output member 14 are shafts or members, and will be referred to as such. Those skilled in the art will appreciate that the input and output members 12, 14 may be components other than shafts. The input shaft or member 12 is continuously connected to an engine (not shown) or to a turbine of a torque converter (not shown). The output shaft or member 14 is continuously connected with a final drive unit (not shown).

In the present embodiment, planetary gear set 102 is a split ring planetary gear set that includes a sun gear member 22, two ring gear members 24, 104 and a carrier member 106 that rotatably supports pinion gears 108 (only one of which is shown). Moreover, sun gear member 22 is fixedly connected to housing 36 of transmission 100 for preventing rotation of sun gear member 22. Ring gear member 104 is connected for common rotation with a second interconnecting shaft or member 112. Carrier member 106 is connected for common rotation with a third interconnecting shaft or member 114 and a fourth interconnecting shaft 115. Pinion gears 108 are configured to mesh with sun gear member 22 and ring gear members 24, 104. Thus, planetary gear set 102 is referred to as a split ring planetary gear set.

Planetary gear set 18 includes a sun gear member 42, a ring gear member 44 and a carrier member 46 that rotatably supports a set of pinion gears 48. Sun gear member 42 is connected for common rotation with input shaft or member 12. Ring gear member 44 is connected for common rotation with a fifth interconnecting shaft or member 116. Carrier member 46 is connected for common rotation with a sixth interconnecting shaft or member 118. Pinion gears 48 are configured to intermesh with both sun gear member 42 and ring gear member 44.

Planetary gear set 20 includes a sun gear member 52, a ring gear member 54 and a carrier member 56 that rotatably supports a set of pinion gears 58. Sun gear member 52 is connected for common rotation with first interconnecting shaft or member 110. Ring gear member 54 is connected for common rotation with output shaft or member 14. Carrier member 56 is connected for common rotation with sixth interconnecting shaft or member 118 and seventh interconnecting shaft or member 122. Pinion gears 58 are configured to intermesh with both sun gear member 52 and ring gear member 54.

The transmission 100 includes a variety of torque-transmitting mechanisms or devices including a first clutch 70, a second clutch 72, a third clutch 74, a fourth clutch 76, a fifth clutch 78 and a brake 80. First clutch 70 is selectively engagable to connect input shaft or member 12 with ring gear member 104 through second interconnecting shaft or member 112. Second clutch 72 is selectively engagable to connect input shaft or member 12 with fifth interconnecting shaft or member 116. Fourth clutch 76 is selectively engagable to connect third interconnecting shaft or member 114 to first interconnecting shaft or member 110. Third clutch 74 is selectively engagable to connect ring gear member 24 with first interconnecting shaft or member 110. Fifth clutch 78 is selectively engagable to connect fourth interconnecting shaft or member 115 to fifth interconnecting shaft or member 116. Brake 80 is selectively engagable to connect seventh interconnecting shaft or member 122 to housing 36 to restrict rotation of carrier member 56.

Moreover, the operation or engagement of clutches 70, 72, 74, 76, 78 and brake 80 to establish the various forward and reverse gear speeds is the same throughout the various embodiments. Transmissions 10 and 100 are capable of transmitting torque from the input shaft or member 12 to the output shaft or member 14 in at least eight forward torque ratios and two reverse torque ratios as indicated in the truth table of FIG. 5. Each of the forward torque ratios and the reverse torque ratios is attained by engagement of one or more of the torque-transmitting mechanisms (i.e. first clutch 70, a second clutch 72, a third clutch 74, a fourth clutch 76, a fifth clutch 78 and a brake 80).

To establish the reverse torque ratio (Rev 1), the torque-transmitting mechanisms or clutches are selected as set forth in the table of FIG. 5. As shown in FIG. 5, brake 80, fourth clutch 76 and first clutch 70 are engaged to achieve the reverse torque ratio (Rev 1). The brake 80 connects the carrier member 56 with the transmission housing 36 in transmission 10 and 100. The fourth clutch 76 connects ring gear member 24 to sun gear member 52 in transmission 10. However, in transmission 100 the fourth clutch 76 connects carrier member 106 to sun gear member 52. The first clutch 70 of transmission 10 connects carrier member 28 to sun gear member 42 and input shaft or member 12. However, the first clutch 70 of transmission 100 connects second ring gear member 104 to sun gear member 42 and input shaft or member 12. Likewise, the eight forward ratios and second reverse ratio are achieved through different combinations of clutch and brake engagement, as shown in FIG. 5.

It will be appreciated that the foregoing explanation of operation and gear states of transmissions 10 and 100 assumes, first of all, that all the clutches and brake not specifically referenced in a given gear state are inactive or disengaged and, second of all, that during gear shifts, i.e., changes of gear state, between at least adjacent gear states, a clutch or brake engaged or activated in both gear states will remain engaged or activated. Those skilled in the art will readily understand that a different speed ratio is associated with each torque ratio. An example of the gear ratios that may be obtained using the embodiments of the present invention are also shown in FIG. 5. Of course, other gear ratios are achievable depending on the gear diameter, gear teeth count and gear configuration selected.

The present invention contemplates that downshifts follow essentially the reverse sequence of the corresponding upshift (as described above), and several power-on skip-shifts are possible (e.g. from 1st to 3rd).

While the best modes for carrying out the invention have been described in detail, those familiar with the art to which this invention relates will recognize various alternative designs and embodiments for practicing the invention within the scope of the appended claims.

The invention claimed is:

1. A transmission comprising:
   an input member;
   an output member;
   first, second and third planetary gear sets each having first, second and third members, wherein the input member is continuously interconnected with the first member of the second planetary gear set;
   a first interconnecting member continuously interconnecting the first member of the first planetary gear set with a stationary element;
   a second interconnecting member continuously interconnecting the third member of the second planetary gear set with the third member of the third planetary gear set;
   six torque-transmitting mechanisms each selectively engageable to interconnect at least one of the first, second, and third members with at least one other of the first member, the second member, the third member, and the stationary element; and
   wherein the torque-transmitting mechanisms are selectively engageable in combinations of at least three to establish at least eight forward speed ratios and at least one reverse speed ratio between the input member and the output member.

2. The transmission of claim 1 wherein a first of the six torque transmitting mechanisms is selectively engageable to interconnect the third member of the first planetary gear set with the input member.

3. The transmission of claim 2 wherein a second of the six torque transmitting mechanisms is selectively engageable to interconnect the second member of the second planetary gear set with the input member.

4. The transmission of claim 1 wherein a third of the six torque transmitting mechanisms is selectively engageable to interconnect the third member of the first planetary gear set with the first member of the third planetary gear set.

5. The transmission of claim 4 wherein a fourth of the six torque transmitting mechanisms is selectively engageable to interconnect the second member of the first planetary gear set with the first member of the third planetary gear set.

6. The transmission of claim 5 wherein a fifth of the six torque transmitting mechanisms is selectively engageable to interconnect the second member of the first planetary gear set with the second member of the second planetary gear set.

7. The transmission of claim 5 wherein a sixth of the six torque transmitting mechanisms is selectively engageable to interconnect the third member of the third planetary gear set with the stationary element.

8. The transmission of claim 1 wherein each of the torque transmitting mechanisms is one of a clutch and a brake.

9. The transmission of claim 1 wherein the first members are sun gears, the second members are ring gears, and the third members are carrier members.

10. The transmission of claim 5 wherein the output member is continuously interconnected with the second member of the third planetary gear set.

11. A transmission comprising:
    an input member;
    an output member;
    first, second and third planetary gear sets each having first, second and third members, wherein the input member is continuously interconnected with the first member of the second planetary gear set and the output member is continuously interconnected with the second member of the third planetary gear set;
    a first interconnecting member continuously interconnecting the first member of the first planetary gear set with a stationary element;
    a second interconnecting member continuously interconnecting the third member of the second planetary gear set with the third member of the third planetary gear set;
    a first torque transmitting mechanism selectively engageable to interconnect the second member of the first planetary gear set with the input member;
    a second torque transmitting mechanism selectively engageable to interconnect the second member of the second planetary gear set with the first member of the second planetary gear set;
    a third torque transmitting mechanism selectively engageable to interconnect the second member of the first planetary gear set with the first member of the third planetary gear set;
    a fourth torque transmitting mechanism selectively engageable to interconnect the third member of the first planetary gear set with the first member of the third planetary gear set;
    a fifth torque transmitting mechanism selectively engageable to interconnect the third member of the first planetary gear set with the second member of the second planetary gear set;
    a sixth torque transmitting mechanism selectively engageable to interconnect the third member of the third planetary gear set with the stationary element; and
    wherein the torque-transmitting mechanisms are selectively engageable in combinations of at least three to establish at least eight forward speed ratios and at least one reverse speed ratio between the input member and the output member.

12. The transmission of claim 11 wherein each of the torque transmitting mechanisms is one of a clutch and a brake.

13. The transmission of claim 11 wherein the first members are sun gears, the second members of the second and third planetary gear sets and the third member of the first planetary gear set are ring gears, and the third members of the second and third planetary gear sets and the second member of the first planetary gear set are carrier members.

14. A transmission comprising:
    an input member;
    an output member;
    first, second and third planetary gear sets each having a sun gear, ring gear and carrier member, wherein the input member is continuously interconnected with the sun gear of the second planetary gear set and the output member is continuously interconnected with the ring gear of the third planetary gear set;
    a first interconnecting member continuously interconnecting the sun gear of the first planetary gear set with a stationary element;
    a second interconnecting member continuously interconnecting the carrier member of the second planetary gear set with the carrier member of the third planetary gear set;
    a first torque transmitting mechanism selectively engageable to interconnect the carrier member of the first planetary gear set with the input member;

a second torque transmitting mechanism selectively engageable to interconnect the ring gear of the second planetary gear set with the sun gear of the second planetary gear set and the input member;

a third torque transmitting mechanism selectively engageable to interconnect the carrier member of the first planetary gear set with the sun gear of the third planetary gear set;

a fourth torque transmitting mechanism selectively engageable to interconnect the ring gear of the first planetary gear set with the sun gear of the third planetary gear set;

a fifth torque transmitting mechanism selectively engageable to interconnect the ring gear of the first planetary gear set with the ring gear of the second planetary gear set;

a sixth torque transmitting mechanism selectively engageable to interconnect the carrier member of the third planetary gear set with the stationary element; and wherein the torque-transmitting mechanisms are selectively engageable in combinations of at least three to establish at least eight forward speed ratios and at least one reverse speed ratio between the input member and the output member.

* * * * *